(12) United States Patent
Ghassemzadeh et al.

(10) Patent No.: US 7,075,968 B1
(45) Date of Patent: Jul. 11, 2006

(54) METHOD FOR WHITENING SPREAD SPECTRUM CODES

(75) Inventors: Saeed S. Ghassemzadeh, Andover, NJ (US); Matthew J Sherman, Succasunna, NJ (US)

(73) Assignee: AT&T Corp., New York, NY (US)

( * ) Notice: Subject to any disclaimer, the term of this patent is extended or adjusted under 35 U.S.C. 154(b) by 1082 days.

(21) Appl. No.: 09/875,767

(22) Filed: Jun. 6, 2001

(51) Int. Cl.
*H04B 1/69* (2006.01)
(52) U.S. Cl. ..................................... 375/130
(58) Field of Classification Search ................ 375/140, 375/130, 139, 135, 137, 145, 149, 141, 146; 370/208, 209, 210, 320, 335, 342, 441
See application file for complete search history.

(56) References Cited

U.S. PATENT DOCUMENTS

| | | | | |
|---|---|---|---|---|
| 6,091,760 | A * | 7/2000 | Giallorenzi et al. | 375/140 |
| 6,671,251 | B1 * | 12/2003 | Kim et al. | 370/209 |
| 6,829,289 | B1 * | 12/2004 | Gossett et al. | 375/141 |
| 6,850,238 | B1 * | 2/2005 | Bryant et al. | 345/440.1 |
| 2002/0012386 | A1 * | 1/2002 | Shanbhag | 375/146 |
| 2002/0067692 | A1 * | 6/2002 | Yun et al. | 370/209 |
| 2002/0126650 | A1 * | 9/2002 | Hall et al. | 370/349 |

* cited by examiner

*Primary Examiner*—Emmanuel Bayard

(57) ABSTRACT

Whitening (i.e., electromagnetic whitening) of a spread spectrum code is achieved, according to principles of the invention, by permuting the code used for spreading of a signal spectrum. Whitening herein means to process the code such that the signal produced while using the code has roughly uniformly distributed power across the entire electromagnetic spectrum of the transmitted signal. In one exemplary embodiment, a base set of codes derived from Walsh matrices is used. The order of chips in each code in the matrix is randomly permuted (using the same permutation for each code) to form a random sequence of chips, which are used to spread information signals. That is the columns of the Walsh matrix are permuted differently each time the codes in the matrix are used for transmission. Because codes derived from Walsh sequences are orthogonal to one another two spread signals using different codes from that Walsh code set but having the same center frequency may transmit without essentially interfering with one another.

20 Claims, 3 Drawing Sheets

POWER DISTRIBUTION OF WALSH CODE 1

POWER DISTRIBUTION AFTER WHITENING

METHOD FOR WHITENING SPREAD SPECTRUM CODES

FIELD OF THE INVENTION

This invention relates to spread spectrum (SS) communications, particularly the use of Code Division Multiple Access (CDMA) and to a process for whitening a spread spectrum (or CDMA) code. It particularly concerns a process of permuting (i.e., scrambling) a spread spectrum code to achieve whitening of the SS code.

BACKGROUND OF THE INVENTION

Spread spectrum is a technique permitting multiple signals to share a common frequency space. Individual signals sharing this space are separated from one another by a spreading code so that each signal while sharing a common frequency preserves its own information (i.e., and channel identity) by means of the spreading code applied to it. It is found to be desirable in some systems to use sets of spreading codes for each channel that are orthogonal to one another to reduce inter-channel interference during simultaneous transmissions.

Another desirable characteristic of the spreading codes is their ability to produce a "white" spectrum, which is to say the signal power is evenly distributed over the spectrum occupied by the signal, or that the signals approximate the spectrum of "white" noise. Whitening techniques are known to exist which whiten a given set of spreading codes so that for each user they approximate white noise with the desired bandwidth. These known techniques include overlaying a pseudo-noise (PN) sequence onto the SS code. Another technique is a code hopping technique where the individual users are periodically assigned differing codes (i.e., code swapping) from a code set used by all the users.

SUMMARY OF THE INVENTION

Whitening (i.e., electromagnetic whitening) of a spread spectrum code is achieved, according to principles of the invention, by permuting the code used for spreading of a signal spectrum. Whitening herein means to process the code such that the signal produced while using the code has roughly uniformly distributed power across the entire electromagnetic spectrum of the transmitted signal.

Spreading sequences (codes) are usually described as being comprised of "chips", where each chip is a binary digit (bit) in the sequence defining a spread spectrum code. But in a more general sense, chips could have non-binary values. The spreading sequences are multiplied with the signal to be encoded to achieve the spread spectrum signal.

Sequence could be said to consist of N chips. For a given spreading sequence, reordering the chips in the sequence will change the spectral properties of the sequence. This reordering is mathematically described as a "permutation". A reordering can be achieved (for example) by indexing the chips in the sequence with an index (say n) with values from 1 to N. By randomly selecting values of the index till all values have been selected exactly once, a permutation is created. The chips in the sequence are then indexed by the permutation, and transmitted in the resulting order.

Different reorderings of code elements correspond to different permutations of the index. If every time a code word is used, a new permutation is transmitted, and these permutations are selected randomly or psuedo-randomly, the spectrum of the sequence will be constantly varying. Psuedo-random means that permutations are selected in a deterministic fashion, but to the observer is appears in some sense random. If the sequence is well balanced (has a similar number of one's and zero's) the resulting spectrum of a code that is regularly permuted will be white. Many commonly used spreading codes (for example Walsh or Quadratic Residue) are well balanced.

Furthermore, if there is a set of M equal length codes, and the same permutation is applied to all of them, relative properties of the codes can be maintained. For example, if each code in the code set were orthogonal to every other code in the code set (the dot product between any two codes in the set is zero), the codes in the set will still be orthogonal to each other after permutation. If the codes sequences were used to form the rows in a matrix, the operation described could be described as a reordering (permutation) of the columns of the matrix.

In one exemplary embodiment, a base set of codes derived from Walsh matrices is used. The order of chips in each code in the matrix is randomly permuted (using the same permutation for each code) to form a random sequence of codes, which are used to spread information signals. That is the columns of the Walsh matrix are permuted differently each time the codes in the Matrix are used for transmission. Because codes derived from Walsh sequences are orthogonal to one another two spread signals using different codes from that Walsh code set but having the same center frequency may transmit without essentially interfering with one another.

In another exemplary embodiment, codes are derived from quadratic residues to generate a set of Quadratic Residues (QR.) codes. Again, by permuting the columns of the associated coding matrix whitening of the spread spectrum signals is achieved.

DETAILED DESCRIPTION

Figure 1:
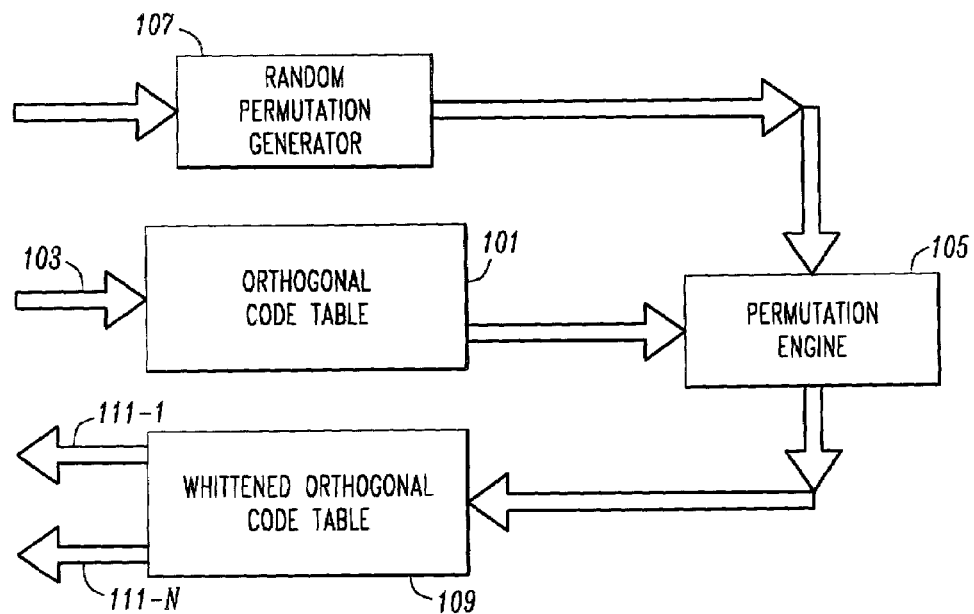
FIG. 1 is a schematic of a coding mechanism for achieving a random sequence of code sets for spreading a signal transmission.

A typical coding mechanism for application in the invention is shown in the FIG. 1. A data processing and storage system includes storage of an orthogonal spreading code (e.g., a Walsh matrix code) input at input 103 and stored in matrix form in the storage medium 101. This matrix code, in the exemplary embodiment, comprises a series of rows (i.e., or column) in which each row (i.e., or column) of the matrix is an orthogonal spreading code. The matrix code may be applied on a row (or column) basis to a permutation engine 105 (i.e. permutation software to permute a row (or column) of digits). Each matrix element may represent a spreading chip.

The actual permutations are created in response to a random permutation generator 107, which generates a pseudo-random sequence of numbers. These numbers, in the exemplary embodiment, are applied to the permutation engine 105 to permute individual rows of the matrix code of the orthogonal code table stored in storage medium 101.

The permuted rows are applied to a storage medium 109 storing the permuted rows of the matrix of storage medium 101. Each permuted row of the matrix code stored in storage medium 109 may be individually outputted on the output paths 111-N. Each of the permuted rows is a spreading code, which may be used when applied in the permuted sequence, to spread separate channels.

Figure 2:
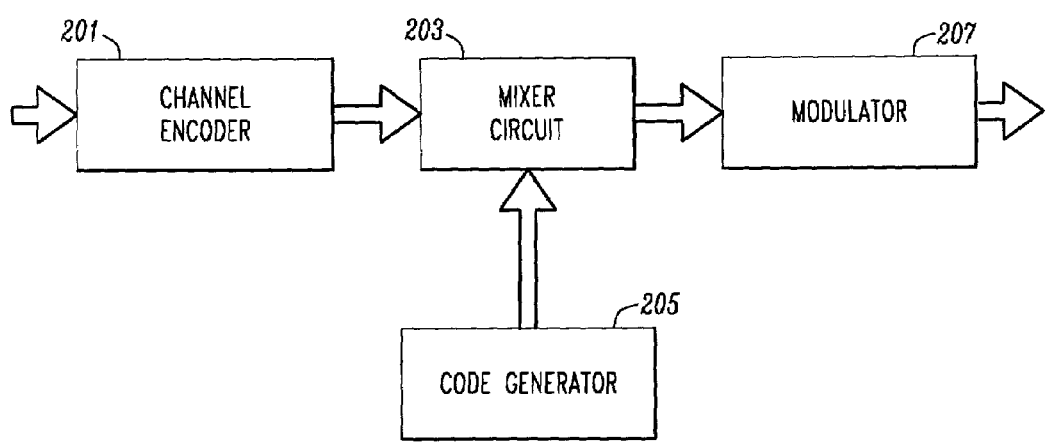
FIG. 2 is a schematic of a spreading mechanism using the random sequence of code sets generated in the mechanism of FIG. 1.

The application of a code of a particular row, in the exemplary embodiment, may use an application arrangement such as shown in the FIG. 2. As shown in this arrangement, an encoded signal or channel as encoded by a channel encoder 201 is applied to a mixer circuit 203. The other input to the mixing circuit 203 is supplied by the code generator 205 which may be the output of one to the permuted rows as supplied by the outputs 111-N of FIG. 1. The clock rate of the code generator would of course be substantially higher than the baud rate of the channel encoder so as to effect spreading. These clock rates would also be synchronized so that exactly one code (row of permuted matrix) would be applied to each channel-encoded symbol from the channel encoder. The output of the mixer circuit is applied to a modulator 207, which modulates the signal for further transmission.

Figure 3:
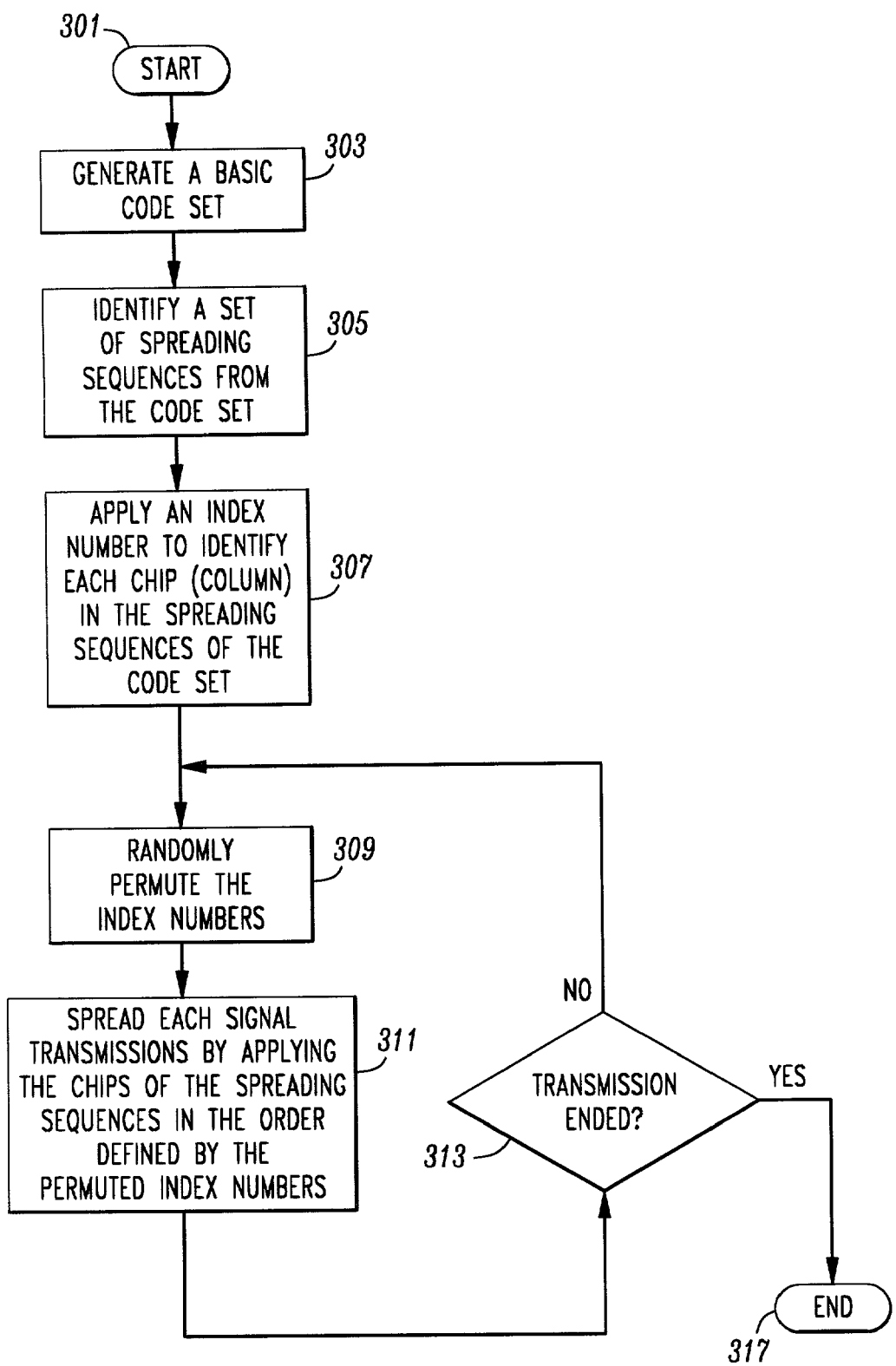
FIG. 3 is a flow chart of the code development process for the sequence of FIG. 2.

The process by which the Walsh codes are generated and permuted is illustrated by the exemplary process flow chart of FIG. 3. The process is entered at the start terminal 301. The first step is to generate a basic code set (i.e., a Walsh code set in the exemplary embodiment) as indicated in step 303. A set of spreading sequences is derived from the code set (i.e., selecting individual rows of a Walsh code matrix) as per instruction of step 305. An index number is applied to each chip in the spreading sequences as per step 309. These indexes correspond to single chips in individual sequences, but can also be taken to correspond to columns in a matrix were the spreading sequences to be stacked a rows to create such a matrix. These index numbers are randomly permuted as shown in step 309.

Once the entire sequence has been used, the flow process continues to step 313, which determines if the transmission being spread has ended. If transmission has not ended, the flow proceeds to the input of step 309 and the index numbers are randomly permuted again. If the transmissions are ended, the process is terminated in the end step 317.

One method of generating whitened spreading codes uses Walsh matrices as the basic code developer. For illustrative purposes, a Walsh code of length 8 is used to develop some example spreading sequences. Walsh codes are well known and are explicitly employed in IS-95 (i.e., a CDMA digital standard for applications in cellular radio systems). All Walsh codes must be of length $2^n$ where n is an integer and which defines an order of the code (i.e., length of the code in digits). A Walsh code of order 3 is (i.e., as presented in matrix format):

| 1 | 1 | 1 | 1 | 1 | 1 | 1 | 1 |
| 1 | -1 | 1 | -1 | 1 | -1 | 1 | -1 |
| 1 | 1 | -1 | -1 | 1 | 1 | -1 | -1 |
| 1 | -1 | -1 | 1 | 1 | -1 | -1 | 1 |
| 1 | 1 | 1 | 1 | -1 | -1 | -1 | -1 |
| 1 | -1 | 1 | -1 | -1 | 1 | -1 | 1 |
| 1 | 1 | -1 | -1 | -1 | -1 | 1 | 1 |
| 1 | -1 | -1 | 1 | -1 | 1 | 1 | -1 |

Each row in the above Walsh matrix is a spreading code. In the example, there are 8 spreading codes. Each one is orthogonal to the others (i.e., a property of Walsh codes). Orthogonality may be verified by multiplying the matrix by its transpose. If this result is normalized by the code length (i.e., herein 8) the matrix has 1s in the diagonal and zeros elsewhere.

This Orthogonality permits multiple users to transmit and receive on the same channel without interfering with each other. However, the spectrum is very peaked at the normalized frequency center of the CDMA spectrum. To improve the spectrum, according to the invention, each column of the matrix is assigned an index number and these index numbers are randomly permuted. For example given the set of 8 integers {0,1,2,3,4,5,6,7} a random sequence may be {0,1, 3,2,4,5,6,7} Obtaining such random permutations is well know in the art and a detailed explanation is not believed to be needed. Permuting the columns of the matrix according to the random sequence gives the matrix:

| 1 | 1 | 1 | 1 | 1 | 1 | 1 | 1 |
| 1 | -1 | -1 | 1 | 1 | -1 | 1 | -1 |
| 1 | 1 | -1 | -1 | 1 | 1 | -1 | -1 |
| 1 | -1 | 1 | -1 | 1 | -1 | -1 | 1 |
| 1 | 1 | 1 | 1 | -1 | -1 | -1 | -1 |
| 1 | -1 | -1 | 1 | -1 | 1 | -1 | 1 |
| 1 | 1 | -1 | -1 | -1 | -1 | 1 | 1 |
| 1 | -1 | 1 | -1 | -1 | 1 | 1 | -1 |

The permuted Walsh matrix with its columns permuted in accordance with the permuted index numbers is orthogonal, as was the original. This may be verified by multiplying the matrix by its transpose and normalizing by its length. The process results in a diagonal of all ones with the rest of the matrix positions assuming a value of zero. While the property of Orthogonality remains the same, the spectrum distribution of the codes before and after the permutation operation is significantly different.

Figure 4A:
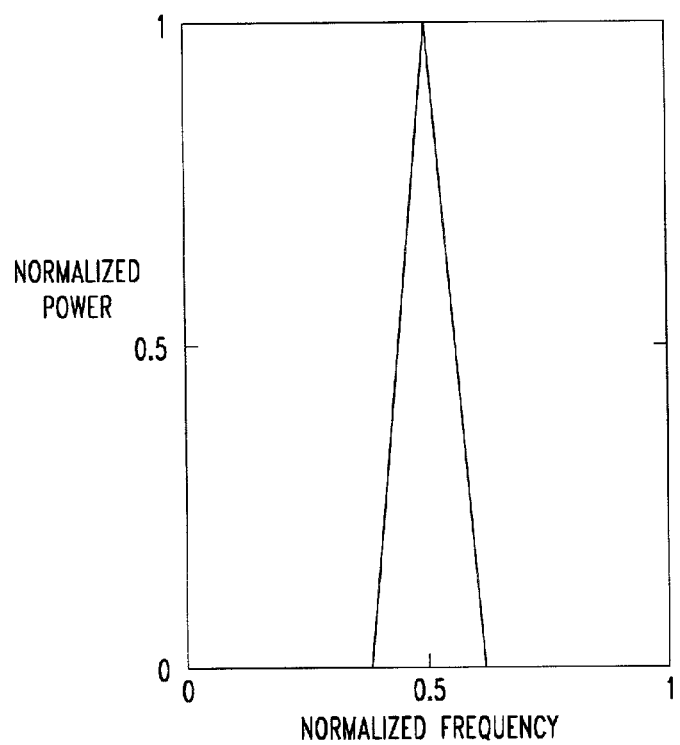
FIGS. 4A and 4B show the power spectrum distribution of a spread signal before and after scrambling.
Figure 4B:
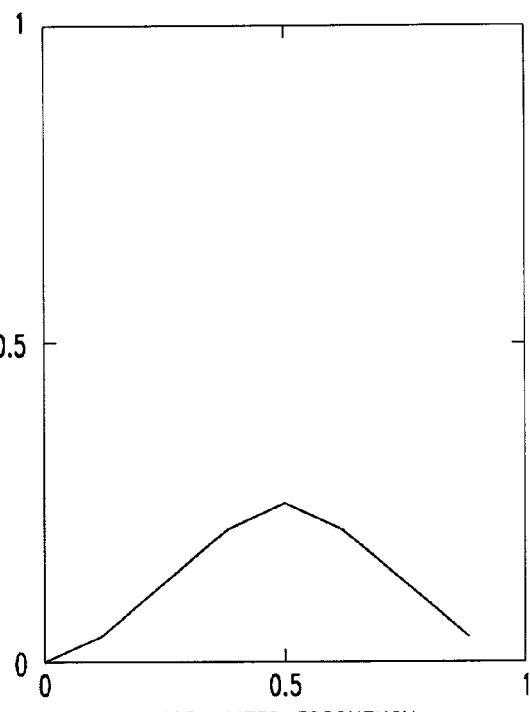

The graph of power spectrum distribution shown in FIG. 4A illustrates the power spectrum distribution after spreading by Walsh Code 1 (the $2^{nd}$ row in the Matrix). As is typical of signals spread by Walsh codes the power distribution is highly peaked (not very white). The power spectrum distribution using the same code after it has been whitened (permuted) using the random sequence given above according to principles of the invention is illustrated by the graph of FIG. 4B. It is readily apparent that the power spectrum is more evenly distributed across the frequency band.

While a particular exemplary embodiment of the invention has been disclosed, it is readily apparent that various modifications and derivatives may be developed by those skilled in the art without departing from the spirit and scope of the invention.

What is claimed is:

1. In a spread spectrum transmission system in which a set of spread spectrum codes are applied to spread spectrum code a corresponding set of signals to be transmitted with the signals each having a substantially white spectrum with signal energy distributed substantially equally across the frequency spectrum of the spread signal, the method of whitening comprising steps of:

generating a set of spreading codes;

assigning an index number to individual chips of the spreading codes;

periodically randomizing the index numbers;

reordering the chip sequence for each of the spreading codes according to the randomized index numbers.

2. The method claim 1, further comprising a step of:
generating spreading codes by means of a Walsh matrix.

3. The method of claim 2, further comprising steps of:
assigning the index numbers to columns of the Walsh matrix; and randomly organizing the index numbers.

4. The method of claim 2, further comprising steps of:
assigning the index numbers to columns of the Quadratic Residue matrix; and randomly organizing the index numbers.

5. The method of claim 3 or 4, further comprising a step of:
successively randomizing the index numbers each time a spreading code is applied.

6. A method of controlling a power spectrum distribution of a spread spectrum signal, comprising the steps of:
generating a base set of codes in a matrix format with each matrix element defining a chip;
randomly permuting an order of chips in each code by;
creating a numerical index and permuting it periodically in accord with generated pseudo random numbers;
arranging chips of the base set of codes placed in straight-line adjacency with each other in accord with the permuted numerical index.

7. The method of claim 6, including a step of:
arranging includes placing chips in a row adjacency.

8. The method of claim 6, including a step of:
arranging includes placing chips in a column adjacency.

9. The method of claim 6, including a step of:
permuting the numerical index includes randomly selecting values of the index until all pseudo random numbers have been selected.

10. The method of claim 9, including a step of:
repeating the set of pseudo random numbers after completion of a use of the set of random numbers.

11. A method of whitening a spread spectrum coded signal, comprising steps of:
generating a code sequence for spreading a signal;
whitening the generated code by randomly reordering elements of the code; and
spreading a signal with a sequence of the generated codes.

12. The method of claim 11, comprising steps of:
the step of reordering is by permutation of the code elements.

13. The method of claim 12, comprising steps of:
indexing elements in the code sequence; and randomly permuting the index.

14. The method of claim 13, comprising steps of:
balancing the generated code sequence with similar numbers of "one" and "zero" elements; and
permuting the balanced code producing a substantially white spectrum.

15. The method of claim 14, comprising steps of:
the step of generating includes forming the code sequences as rows in a matrix; and
the step of reordering includes reordering (permuting) columns of the matrix.

16. The method of claim 14, comprising steps of:
the step of generating includes forming the code sequences as columns in a matrix; and
the step of reordering includes reordering (permuting) rows of the matrix.

17. The method of claim 11, comprising steps of:
developing an orthogonal spreading code from a Walsh matrix.

18. The method of claim 11, comprising steps of
developing a spreading code from a quadratic residue.

19. The method of claim 11 comprising the steps of:
archiving through the spreading code with a sequence of reordered elements a power spectrum evenly distributed across a frequency band of the signal.

20. A method executed in a transmitter for transmitting a signal comprising the steps of:
developing a set of pseudo random index numbers between 1 and N;
spreading said signal and transmitting the spread signal, where the spreading is carried out by multiplying each successive portion of said signal with chips of a code from a set of N mutually orthogonal codes having an associated ordinal number of the set, where the code that is selected for multiplying said each successive portion of said signal has an associated ordinal number that corresponds to successive ones of said index number in said set of index numbers.

* * * * *